Patented Sept. 12, 1944

2,357,978

UNITED STATES PATENT OFFICE 2,357,978

ALKYLATION OF AROMATIC HYDROCARBONS

Louis Schmerling and Arthur M. Durinski, Chicago, Ill., assignors to Universal Oil Products Company, Chicago, Ill., a corporation of Delaware No Drawing. Application May 24, 1941, Serial No. 395,060

9 Claims. (Cl. 260—671)

This invention relates to the treatment of aromatic hydrocarbons to produce therefrom alkylated aromatic hydrocarbons. More specifically the process is concerned with the interaction of an aromatic hydrocarbon and an olefin to produce mono-alkylated and poly-alkylated aromatic hydrocarbons.

It is recognized that benzene has been converted into alkylated benzenes by treatment with an olefin in the presence of catalysts such as sulfuric acid or aluminum chloride. Each of the mentioned previously used catalysts has certain disadvantages which are not encountered when using the present process. Thus with aluminum chloride complex addition compounds are formed apparently involving the aluminum chloride used as alkylating catalyst, and sludge-like materials are produced which decrease the life of the aluminum chloride catalyst and interfere with continuous operation of the process. When sulfuric acid serves as the alkylating catalyst, substantial amounts of olefin polymerization occur and part of the aromatic and alkylated aromatic hydrocarbons undergo sulfonation and oxidation reactions which further tend to decrease the yield of the desired alkylated aromatic hydrocarbons. The present invention differentiates from the prior art on this subject in that the aromatic and olefinic hydrocarbons are caused to interact in the presence of hydrogen chloride to form alkylated aromatic hydrocarbons substantially free from undesired products.

In one specific embodiment the present invention comprises a process for producing alkylated aromatic hydrocarbons which comprises contacting aromatic and olefinic hydrocarbons with hydrogen chloride under alkylating conditions of temperature and pressure.

Aromatic hydrocarbons, such as benzene, toluene, other alkylated benzenes, naphthalene, alkylated naphthalene, other poly-nuclear aromatics, etc., which are alkylated by olefinic hydrocarbons as hereinafter set forth, may be obtained by the distillation of coal, by the dehydrogenation and cyclization of aliphatic hydrocarbons and of alkylated aromatic hydrocarbons, and by other means.

Olefins utilizable as alkylating agents may be either normally gaseous or normally liquid and comprise ethylene and its higher homologs both gaseous and liquid, the last-named including various polymers of normally gaseous olefins. Cyclic olefins may also serve as alkylating agents but generally under conditions of operation different from those employed in the alkylation of aromatic hydrocarbons with non-cyclic straight and branched chain olefins. Olefinic hydrocarbons utilizable as alkylating agents are obtained from any source and comprise products of catalytic and thermal cracking of oils or those obtained by dehydrogenating the corresponding paraffinic hydrocarbons or by dehydrating alcohols.

While the alkylation reaction between aromatic and olefinic hydrocarbons occurs in the presence of hydrogen chloride at a temperature of from about 100° to about 450° C., the velocity of this conversion is increased by the further presence within a reaction zone of one or more of a number of solid packing materials of which the following are representative: silica gel, alumina, bauxite, zinc oxide, ferric oxide, magnesia, diatomaceous earth, clays, silica-alumina composites, etc. These different reactor packing materials may also be composited in many ways. Thus zinc oxide may be used as such or it may be supported on suitable carriers including diatomaceous earth, clays, various forms of alumina, silica-alumina composites, etc. The zinc oxide may be placed on the carrier by a series of steps which comprise impregnation of the carrier with an aqueous solution of zinc nitrate, calcination of the nitrate to the oxide or by treating the supported zinc nitrate with a water-soluble carbonate to precipitate zinc carbonate which is then calcined to the oxide. Also, zinc oxide and another material such as alumina may be mixed intimately as powders and then pelleted to form packing material suitable for use in the process.

Alkylation of aromatic hydrocarbons of the types hereinabove set forth are also carried out in the presence of hydrogen or of a hydrogen-containing gas. There is relatively little formation of carbon and heavy hydrocarbonaceous material upon the reactor packing material when these conversion reactions are carried out under hydrogen pressure, but carbon formation does occur to a substantial extent in the absence of added hydrogen.

In effecting reaction between benzene or other aromatic hydrocarbons and olefins according to the process of the present invention, the exact method of procedure varies with the nature of the reacting constituents, the amount of hydrogen chloride employed, and also with the composition of the reactor packing material, the presence of which accelerates the alkylation reaction. A simple procedure utilizable in the case of an aromatic hydrocarbon which is normally liquid or if solid is readily soluble or easily dispersable in a substantially inert liquid and a normally gaseous or liquid olefinic hydrocarbon, consists in contacting the aromatic and olefinic hydrocarbons with hydrogen chloride preferably in the presence of a suitable reactor packing material, at a temperature of from about 100° to about 450° C. and preferably from about 200° to about 400° C. under a pressure of from substantially atmospheric to approximately 200 atmospheres or more.

Intimate contact of the reacting components and catalyst is effected by passing the reaction mixture over or through a fixed bed of the reactor packing material or the reacting components may be mixed in the presence of finely powdered silica or other contacting material in a substantially flowing stream type of operation. The reaction mixture subjected to alkylation treatment preferably contains between about 1 and about 20 molecular proportions of aromatic hydrocarbon per 1 molecular proportion of olefinic hydrocarbon in order to favor interaction of the olefinic hydrocarbon with the aromatic hydrocarbon or mixture of aromatic hydrocarbons being treated, and to substantially prevent olefin polymerization.

Thus the hydrocarbon mixture containing normally liquid aromatic hydrocarbons and a fraction containing olefinic hydrocarbons are commingled with hydrogen chloride and passed through a reactor preferably containing one or more of the packing materials hereinabove set forth. Also, at least a portion of the aromatic hydrocarbon mixture is charged to such a reactor together with hydrogen chloride, while the fraction containing olefinic hydrocarbons, as such or diluted by another portion of the aromatic hydrocarbon mixture being treated, is introduced at various points between the inlet and the outlet of the reaction zone in such a way that the reaction mixture being subjected to alkylating conditions will at all times contain a relatively low proportion of olefinic hydrocarbons and thus favor alkylation rather than olefin polymerization.

While the method of passing aromatic and olefinic hydrocarbons, either together or countercurrently, through a suitable reactor preferably containing a granular packing material, is generally customary procedure, the condensation or alkylation reaction between aromatic and olefinic hydrocarbons may be effected in the presence of hydrogen chloride in a closed vessel in which some of the reacting constituents are in liquid phase and in which the added solid material is preferably in finely divided form and is maintained in dispersion or suspension by some method of agitation. The choice of operating procedure is dependent upon the conditions such as the temperature and pressure found to be most effective for producing the desired conversion between particular aromatic and olefinic hydrocarbons.

The reactions between aromatic and olefinic hydrocarbons in the presence of hydrogen chloride are apparently of a relatively simple character although they may be accompanied not only by polymerization but by certain amounts of decomposition or destructive hydrogenation when carried out under a relatively high pressure of hydrogen at a temperature in excess of about 350° C. Although the alkylation of an aromatic hydrocarbon by an olefin is not understood clearly or completely, a typical alkylation reaction apparently involved the addition of an aromatic hydrocarbon to the double bond of an olefinic hydrocarbon, such as an olefin containing from 2 to 5 carbon atoms per molecule, to produce an alkylated aromatic hydrocarbon, which may in turn undergo further reaction with one or more additional molecular proportions of the olefinic hydrocarbon thus producing di-alkylated and poly-alkylated aromatic hydrocarbons.

Within certain limits it is possible to produce mainly mono-alkylated aromatic hydrocarbons by proper adjustment of the quantity of hydrogen chloride catalyst employed, the ratio of olefinic to aromatic hydrocarbons in the reaction mixture, the operating conditions of temperature, pressure, rate of feed through the alkylation reactor, and other factors. The different olefinic hydrocarbons are also not necessarily equivalent in their action upon different aromatic hydrocarbons, also of different reactivities, which may be alkylated by the present process under proper conditions selected from those within the general limits hereinabove set forth.

The reaction between an aromatic hydrocarbon and a hexene or other normally liquid olefin of high molecular weight may involve not only alkylation but also a depolymerization or splitting of the olefin into olefin fragments of lower molecular weights which react with the aromatic hydrocarbon to produce alkylated aromatic hydrocarbon. Thus benzene and di-isobutene or tri-isobutene react and yield tertiary butyl benzene and poly tertiary butyl benzenes, while nonene and benzene may yield both butyl and amyl benzenes by reactions apparently involving the so-called depolymerization and alkylation.

In general, the products formed by interaction of an olefinic hydrocarbon with a molal excess of an aromatic hydrocarbon in the presence of hydrogen chloride are separated from the hydrogen chloride and unreacted aromatic hydrocarbon by suitable means, as by distillation, and the recovered hydrogen chloride and the unreacted portion of the aromatic hydrocarbon originally charged are returned to the process and mixed with additional quantities of the aromatic and olefinic hydrocarbons being charged together with additional hydrogen chloride which may be necessary to maintain sufficient catalytic activity to promote the desired alkylation reaction. The alkylated product is separated into a fraction comprising essentially mono-alkylated aromatic hydrocarbons and a higher boiling fraction containing poly-alkylated aromatic hydrocarbons. When desired, the poly-alkylated aromatic hydrocarbons are recycled and commingled with the olefinic and aromatic hydrocarbons being charged. This recycling of poly-alkylated aromatic hydrocarbons generally aids in the production of mainly mono-alkylated aromatic hydrocarbons by depressing the further formation of highly alkylated derivatives.

Further, the addition of an alkyl group to an aromatic hydrocarbon may be effected substantially as herein set forth but by using as alkylating agent a substance capable of producing olefins under the operating conditions of the process. Such olefin-producing substances include alcohols and ethers which undergo dehydration in the presence of the catalyst and form olefins which react further with aromatic hydrocarbons to produce desired alkylated aromatic hydrocarbons. Alkyl halides, preferably chlorides or bromides, may be employed similarly as these generally lose hydrogen halide under the operating conditions employed and the resulting olefinic hydrocarbons may thus serve as alkylating agents. Esters of organic acids similarly yield organic acid and olefins, the latter undergoing further reaction with aromatics to form alkylated aromatic hydrocarbons.

The following examples are given to illustrate the character of the present process, although the data presented are not introduced with the intention of unduly limiting the generally broad scope of the invention.

EXAMPLE I 80 parts by weight of benzene, 20 parts by weight of propene, and 3 parts by weight of hydrogen chloride were placed in a steel autoclave, hydrogen was added thereto to 100 atmospheres initial pressure, and the resulting mixture was heated for 4 hours at 300° C. After cooling to room temperature the reaction mixture was removed from the autoclave and found to contain 14 parts by weight of monoisopropyl benzene and 5 parts by weight of higher boiling alkylated material.

EXAMPLE II 80 parts by weight of benzene, 20 parts by weight of propene, 10 parts by weight of calcined alumina, and 2.4 parts by weight of anhydrous hydrogen chloride were placed in an autoclave, hydrogen was added thereto to 100 atmospheres pressure, and the resulting reaction mixture was heated for 4 hours at 300° C. after which the autoclave and contents were cooled to 20° C. The resulting reaction mixture yielded 12 parts by weight of mono-isopropyl benzene and 5 parts by weight of poly-isopropyl benzenes.

EXAMPLE III 80 parts by weight of benzene, 20 parts by weight of propene, 5 parts by weight of zinc oxide, and 2.6 parts by weight of hydrogen chloride were placed in an autoclave to which hydrogen was added to 100 atmospheres pressure and the autoclave containing the resulting mixture was thereafter heated for 4 hours at 300° C. After cooling the autoclave, the products removed therefrom were found to contain 6 parts by weight of isopropyl benzene and 3 parts by weight of polyisopropyl benzene.

EXAMPLE IV 80 parts by weight of benzene, 20 parts by weight of propene, 7 parts by weight of powdered alumina, 3 parts by weight of powdered zinc oxide, and 2.7 parts by weight of hydrogen chloride were placed in the steel autoclave also employed in Examples I and II. After adding hydrogen to 100 atmospheres initial pressure, the autoclave was heated for 4 hours at 300° C. and a product was obtained containing 32 parts by weight of mono-isopropyl benzene, 9 parts by weight of di-isopropyl benzene, and 3 parts by weight of more-highly propylated benzenes. Upon the basis of the propene taken, the respective yields of mono-alkylated and di-alkylated products were 56% and 23% of the theoretical.

EXAMPLE V

In each of a number of runs a mixture of 80 parts by weight of benzene, 20 parts by weight of propene, 10 parts by weight of silica gel and the amounts of hydrogen chloride shown in the following table were placed in an open-top glass liner inserted in the steel autoclave as used in the preceding examples. The autoclave containing the reaction mixture was then charged with hydrogen to 100 atmospheres initial pressure and thereafter rotated and heated for 4 hours at the temperatures also shown in the table. After each run the autoclave was cooled, the reaction product was removed, washed first with caustic and then with water, dried and distilled to separate unconverted benzene from alkylation products shown in the table as mono-, di-, and higher-isopropyl benzenes.

TABLE

Alkylation of benzene with propene in the presence of hydrogen chloride and silica gel

| Run No. | Hydrogen chloride | Temperature | Isopropylbenzene, parts by wt. | | |
|---|---|---|---|---|---|
| | | | Mono- | Di- | Higher |
| | Parts by wt. | °C. | | | |
| 1 | 0 | 200 | 0 | | |
| 2 | 2 | 200 | 0 | | |
| 3 | 18 | 200 | 21 | 12 | 3 |
| 4 | 4 | 250 | 16 | 4 | 4 |
| 5 | 3 | 350 | 22 | 8 | 4 |

The nature of the present invention and its commercial utility can be seen from the specification and examples given, although neither section is intended to limit its generally broad scope.

We claim as our invention:

1. A process for producing alkylated aromatic hydrocarbons which comprises reacting an aromatic hydrocarbon with an olefin in the presence of an alkylating catalyst consisting essentially of hydrogen chloride.

2. A process for producing alkylated aromatic hydrocarbons which comprises reacting an aromatic hydrocarbon with an olefin at a temperature of from about 100° C. to about 450° C. and in the presence of an alkylating catalyst consisting essentially of hydrogen chloride.

3. A process for producing alkylated aromatic hydrocarbons which comprises reacting an aromatic hydrocarbon with an olefin in the presence of a solid reactor packing material and an alkylating catalyst consisting essentially of hydrogen chloride.

4. A process for producing alkylated aromatic hydrocarbons which comprises reacting an aromatic hydrocarbon with an olefin in the presence of alumina and an alkylating catalyst consisting essentially of hydrogen chloride.

5. A process for producing alkylated aromatic hydrocarbons which comprises reacting an aromatic hydrocarbon with an olefin in the presence of silica and an alkylating catalyst consisting essentially of hydrogen chloride.

6. A process for producing alkylated aromatic hydrocarbons which comprises reacting an aromatic hydrocarbon with an olefin in the presence of zinc oxide and an alkylating catalyst consisting essentially of hydrogen chloride.

7. A process for producing alkylated aromatic hydrocarbons which comprises reacting an aromatic hydrocarbon with an olefin at a temperature of from about 100° C. to about 450° C. in the presence of a solid reactor packing material and an alkylating catalyst consisting essentially of hydrogen chloride.

8. A process for producing alkylated benzene which comprises reacting benzene with an olefin in the presence of an alkylating catalyst consisting essentially of hydrogen chloride.

9. A process for producing alkylated benzene which comprises reacting benzene with an olefin in the presence of a solid reactor packing material and an alkylating catalyst consisting essentially of hydrogen chloride.

LOUIS SCHMERLING.
ARTHUR M. DURINSKI.